(12) United States Patent
Beuville et al.

(10) Patent No.: US 11,561,132 B2
(45) Date of Patent: Jan. 24, 2023

(54) PER-PIXEL DETECTOR BIAS CONTROL

(71) Applicant: RAYTHEON COMPANY, Waltham, MA (US)

(72) Inventors: Eric J. Beuville, Goleta, CA (US); Micky Harris, Lompoc, CA (US); Ryan Boesch, Goleta, CA (US); Christian M. Boemler, Goleta, CA (US)

(73) Assignee: RAYTHEON COMPANY, Waltham, MA (US)

( * ) Notice: Subject to any disclaimer, the term of this patent is extended or adjusted under 35 U.S.C. 154(b) by 3 days.

(21) Appl. No.: 16/892,430

(22) Filed: Jun. 4, 2020

(65) Prior Publication Data

US 2021/0381888 A1    Dec. 9, 2021

(51) Int. Cl.
  *G01J 1/46* (2006.01)
  *G01J 5/34* (2022.01)
  *G01J 1/44* (2006.01)

(52) U.S. Cl.
  CPC . *G01J 1/46* (2013.01); *G01J 5/34* (2013.01); *G01J 2001/446* (2013.01)

(58) Field of Classification Search
  CPC ........... G01J 1/46; G01J 5/34; G01J 2001/446
  See application file for complete search history.

(56) References Cited

U.S. PATENT DOCUMENTS

| | | | |
|---|---|---|---|
| 5,774,400 A | 6/1998 | Lancaster et al. | |
| 7,898,852 B1 | 3/2011 | Levy et al. | |
| 8,766,272 B2 * | 7/2014 | Yu | H01L 31/102 257/72 |
| 9,082,673 B2 * | 7/2015 | Yu | H01L 27/14 |
| 9,378,821 B1 | 6/2016 | Prabhakar et al. | |
| 2009/0086538 A1 | 4/2009 | Jenne et al. | |
| 2009/0121139 A1 | 5/2009 | Chammings | |
| 2010/0117138 A1 | 5/2010 | Huerta et al. | |

(Continued)

FOREIGN PATENT DOCUMENTS

WO    2016038986 A1    3/2016
WO    2020041651 A1    2/2020

OTHER PUBLICATIONS

Mead, et al. "ANALOG VLSI Implementation of Neural Systems" 1989 by Kluwer Academic Publishers, 249 pages.

(Continued)

*Primary Examiner* — David P Porta
*Assistant Examiner* — Fani Boosalis
(74) *Attorney, Agent, or Firm* — Cantor Colburn LLP

(57) ABSTRACT

A pixel includes a detector that changes its operating characteristics based on incident energy, an integration capacitor arranged to discharge stored charge through the detector based on changes in the operating characteristics, and an floating gate injection device disposed between the photodiode and the integration capacitor that controls flow of the charge from the integration capacitor to the detector. The floating gate injection device has a gate, a source electrically coupled to the detector at a first node, and a drain electrically coupled to the integration capacitor. The gate has a control voltage ($V_T$) stored therein to set to a per-pixel bias gate voltage to control a detector bias voltage of the detector at the first node.

18 Claims, 8 Drawing Sheets

(56) References Cited

U.S. PATENT DOCUMENTS

| | | | |
|---|---|---|---|
| 2013/0193307 A1* | 8/2013 | Sander | H04N 5/361 250/208.1 |
| 2013/0252559 A1 | 9/2013 | Deguch et al. | |
| 2013/0277561 A1 | 10/2013 | Woolaway et al. | |
| 2016/0088243 A1 | 3/2016 | Higash et al. | |
| 2020/0066781 A1 | 2/2020 | Beuville et al. | |
| 2021/0183925 A1 | 6/2021 | Shukuri et al. | |

OTHER PUBLICATIONS

Shibata, et al. "A Functional MOS Transistor Featuring Gate-Level Weighted Sum and Threshold Operations", IEEE Transactions on Electron Devices, vol. 39, No. 6, Jun. 1992, 12 pages.

Yang, et al. "Multiple Input Floating-Gate MOS Differential Amplifiers and Applications for Analog Computation" Proceedings of 36th Midwest Symposium on Circuits and Systems, IEEE, Date of Conference: Aug. 16-18, 1993, 5 pages.

Notification of Transmittal of the International Preliminary Report on Patentability of the International Searching Authority, or the Declaration; PCT/US2019/047810; dated Mar. 4, 2021, 11 pages.

Notification of Transmittal of the International Search Report of the International Searching Authority, or the Declaration; PCT/US2019/047810; dated Oct. 16, 2019, 18 pages.

Notification of Transmittal of the Written Opinion of the International Searching Authority; PCT/US2019/047810; dated Oct. 16, 2019, 11 pages.

US Advisory Action for U.S. Appl. No. 16/549,069 dated Oct. 21, 2021, 5 pages.

US Final Office Action for U.S. Appl. No. 16/549,069 dated Jul. 27, 2021, 5 pages.

US Non-Final Office Action for U.S. Appl. No. 16/549,069 dated Mar. 8, 2021, 14 pages.

US Notice of Allowance for U.S. Appl. No. 16/549,069 dated Apr. 26, 2022, 8 pages.

US Non-Final Office Action for U.S. Appl. No. 16/549,069 dated May 27, 2022, 12 pages.

\* cited by examiner

PER-PIXEL DETECTOR BIAS CONTROL

BACKGROUND

The present disclosure relates to an imager and, in particular, a pixel circuit that includes a per-pixel bias control for an imager.

In legacy analog imagers, particularly infrared imagers, current that is generated by a detector (e.g., diode or bolometer) is integrated into a well or integration capacitor coupled to the detector and then, once per video frame, the voltage or charge of the well capacitor is transferred to a down-stream analog-to-digital converter (ADC), where the voltage is converted to a binary value.

One configuration of an imager uses a direct injection (DI) transistor. In such a circuit charge from a detector is accumulated over an integration capacitor. Charge is accumulated, in general, until a readout time. When the end of the integration time is reached, the charge stored in integration capacitor is provided to a readout circuit. Such circuits can either integrate then read or read while integrating circuits.

The detector bias voltage is controlled by a direct injection transistor. The gate of the injection transistor is coupled to a bias voltage. The level of this voltage can be selected by the skilled artisan and is used, in part, to set the bias voltage of the detector.

However, in some cases detector bias non-uniformity across the array affects the overall performance and yield (pixels not meeting performance) of an imaging array. The same may also be true in other types of systems that use either buffered direct injection (BDI) transistor or where a capacitive transimpedance amplifier (CTIA) is used to read information from the detector.

SUMMARY

According to one embodiment, a pixel includes detector that changes its operating characteristics based on incident energy is disclosed. The pixel also includes an integration capacitor arranged to discharge stored charge through the detector based on changes in the operating characteristics and a floating gate injection device disposed between the photo-diode and the integration capacitor that controls flow of the charge from the integration capacitor to the detector. The floating gate injection device has a gate, a source electrically coupled to the detector at a first node, and a drain electrically coupled to the integration capacitor. The gate has a control voltage ($V_T$) stored therein to set to a per-pixel bias gate voltage to control a detector bias voltage of the detector at the first node.

According to any prior pixel embodiment, the detector is a photo-diode having an anode electrically coupled to a detector common voltage ($V_{DetCom}$).

According to any prior pixel embodiment, the integration capacitor is electrically coupled to a system reference level (Vreset).

According to any prior pixel embodiment, the pixel can further include a reset switch coupled in parallel with the integration capacitor.

According to any prior pixel embodiment, the detector is a microbolometer a first end connected to the source and a second end electrically coupled to a detector common voltage ($V_{DetCom}$).

According to any prior pixel embodiment, the integration capacitor is electrically coupled to a system reference level (Vreset).

According to any prior pixel embodiment, a reset switch is coupled in parallel with the integration capacitor.

Also disclosed is a pixel that includes an amplifier. Such a pixel can include: a detector that changes its operating characteristics based on incident energy; an integration capacitor arranged to discharge stored charge through the detector based on changes in the operating characteristics; an injection transistor device disposed between the photo-diode and the integration capacitor that controls flow of the charge from the integration capacitor to the detector, the injection transistor having a gate, a source electrically coupled to the detector at a first node, and a drain electrically coupled to the integration capacitor; and a feedback amplifier that provides a bias voltage to the injection transistor, the feedback amplifier having an active input that is connected to the first node and that compares a voltage at the first node to a desired voltage to create the bias voltage. The feedback amplifier includes a floating gate device that has the a control voltage ($V_T$) stored on a gate of the floating gate device.

In any prior pixel that includes an amplifier, the detector can be a photo-diode having an anode electrically coupled to a detector common voltage ($V_{DetCom}$).

In any prior pixel that includes an amplifier the integration capacitor is electrically coupled to a system reference level (Vreset).

In any prior pixel that includes an amplifier, the pixel can further include a reset switch coupled in parallel with the integration capacitor.

In any prior pixel that includes an amplifier, the feedback amplifier can be either a differential amplifier or a single ended amplifier.

Also disclosed is a pixel that includes a detector that changes its operating characteristics based on incident energy, the detector having a first end and a second end, the first end being connected to a first node and capacitance trans impedance amplifier (CTIA) circuit coupled to the detector. In such a CTIA pixel, the CTIA circuit includes a feedback amplifier that provides a bias voltage, the feedback amplifier having an active input that is connected to the first node and that compares a voltage at the first node to a desired voltage and to provide an output at an output of the CTIA circuit. The CTIA pixel also includes an integration capacitor connected between the first node and the output of the CTIA circuit. In the CTIA pixel the feedback amplifier includes a floating gate device that has a control voltage stored on a gate of the floating gate device.

In any prior CTIA pixel, the detector can be a photo-diode having an anode electrically coupled to a detector common voltage ($V_{DetCom}$) and a cathode connected the first node.

In any prior CTIA pixel, a reset switch is coupled in parallel with the integration capacitor between the first node and the output of the CTIA circuit.

In any prior CTIA pixel, the feedback amplifier can be a differential amplifier or a single ended amplifier.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
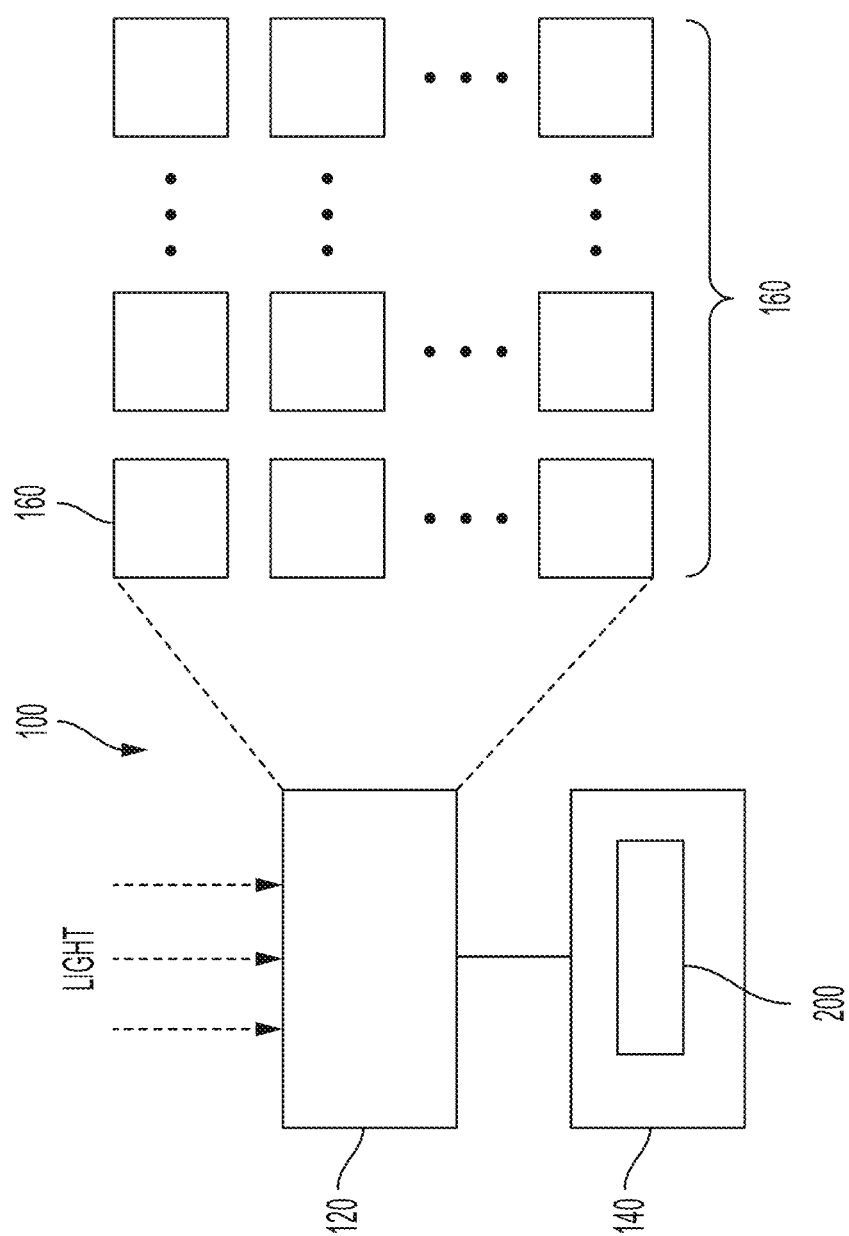
FIG. 1 is a schematic diagram illustrating image detector in accordance with embodiments.

FIG. 1 is a schematic diagram illustrating an image detector 100 in accordance with embodiments. Such a detector 100 may be deployed, for example, on a satellite or other airborne apparatus such as an aircraft or any land- or sea-based tactical application in which it is a requirement that frame rate not be limited by array size. Image detector 100 may be a focal plane array (FPA), active pixel sensor (APS) or any other suitable energy wavelength sensing device. The image detector 100 may be used as a component of a photographic and/or image capturing device, such as a digital camera, video camera or other similar device. The image detector 100 may include a detection device 120 and signal converter 140.

The detection device 120 includes an array of photosensitive/energy wavelength sensitive detector unit cells 160 arranged in an X×Y matrix. Each of the detector unit cells 160 may accumulate charge or produce a current and/or voltage in response to energy (e.g., light or radiation) incident upon the detector unit cell 160 and may correspond to a pixel in a captured electronic image. One or more of the detector unit cells 160 may include a detector that is a photovoltaic detector (e.g., a photovoltaic single absorber detector or a photovoltaic multi-absorber (multi-junction) detector), a microbolometer, a barrier device detector, a position sensitive detector (PSD) or other suitable detector. The operating characteristics of such devices change based on incident energy. For example, in the case of a photo diode, exposure to light causes current to flow in the device. For a microbolometer, infrared-radiation causes the resistance of the bolometer to change. This change will result in changes in current through the bolometer which can be measured to form an image.

The signal converter 140 may be used for processing of the incident energy (e.g., to create an image representative of the incident light). For example, the signal converter 140 can be an analog-to-digital converter (ADC). The signal converter 140 interfaces with the detection array 120 to receive a signal, such as the accumulated charge or the current and/or voltage produced in response to light incident upon the detector unit cells 160. In one embodiment, the signal converter 140 includes a read out integrated circuit (ROIC) 200 that accumulates voltage/current and produces a digital output.

Certain embodiments disclosed herein shall be presented as examples of detector unit cells 160 and may be referred to as a detector front end or input stage. As such, an input stage is any stage that accumulate charge or produce a current and/or voltage in response to light incident upon the detectors in the cell. In addition, embodiments may also be shown as include a signal converter but that is not required and is given for completeness and not by way of limitation. For example, in FIG. 2, the input stage 160 is shown connected to comparator/counter to form a digital pixel but the input stage could be used in other configurations.

In each of the following embodiments, the input stage includes a floating gate device that is used to directly control the detector bias voltage by adjusting the floating gate device threshold voltage of the DI, BDI or CTIA input transistor. Examples of such floating gate devices include a SONOS transistor (discussed below) as well as traditional floating gate device such a EPROM, EEPROM, NAND flash, NOR flash as well other floating-gate techniques available in standard CMOS process.

The readout integrated circuit (ROIC) 140 can be implemented as an array of unit cells that are arranged in an X×Y matrix corresponding to the orientation of the X×Y matrix of the detector unit cells 160. Thus, each unit cell may be interconnected with a corresponding detector unit cell 160 by way of one or more direct bond interconnects, such as direct metal-to-metal interconnects or indium bump interconnects. Each detector unit cell can also be referred to as pixel herein.

In such systems and as generally described above, in that case where the detector is a diode it is known to utilize an injection transistor to place a diode in the detector unit cell into reverse bias so that it will generate current when exposed to light. In such a systems a generally global voltage is applied to the gate of all of the injection transistors to achieve the detector diode reverse bias. However, given variations in both detector and the DI transistors, various cells in a particular array may be unusable when such global gate bias voltage is applied. For example, in some cases, a particular diode may produce too much so-called "dark current" when the gate of its associated injection transistor is coupled to the global gate bias voltage. The dark current may be so great that it makes any measurement from the diode unusable and, as such, makes the particular diode unusable. The dark current may also be a level such that the diode performance is degraded from where it would be at a more optimal bias current. The same issues may also arise in a CTIA front end or a BDI front end. Embodiments disclosed herein can be utilized in all such types of front ends that include at least one transistor. However, herein the transistor can be implemented as or replaced by a floating gate device as described above.

In addition, in cases where the detector is a microbolometer, the floating gate controls the bias to address the non-uniformity of the microbolometer resistance.

Similar problems may also exist when supply voltage droop causes the voltage applied to a gate of a particular injection transistor results in a lower than desired bias voltage being applied to the diode/microbolometer. Still further, variations in the injection transistors themselves can have negative effects. Herein is disclosed a system where each pixel includes a floating gate devices that can be individually programmed so that a particular detector can operate in a useable manner. This can alleviate problems due to variations in a global gate voltages across an array and address the variations in individual detectors or transistors or both.

Figure 2:
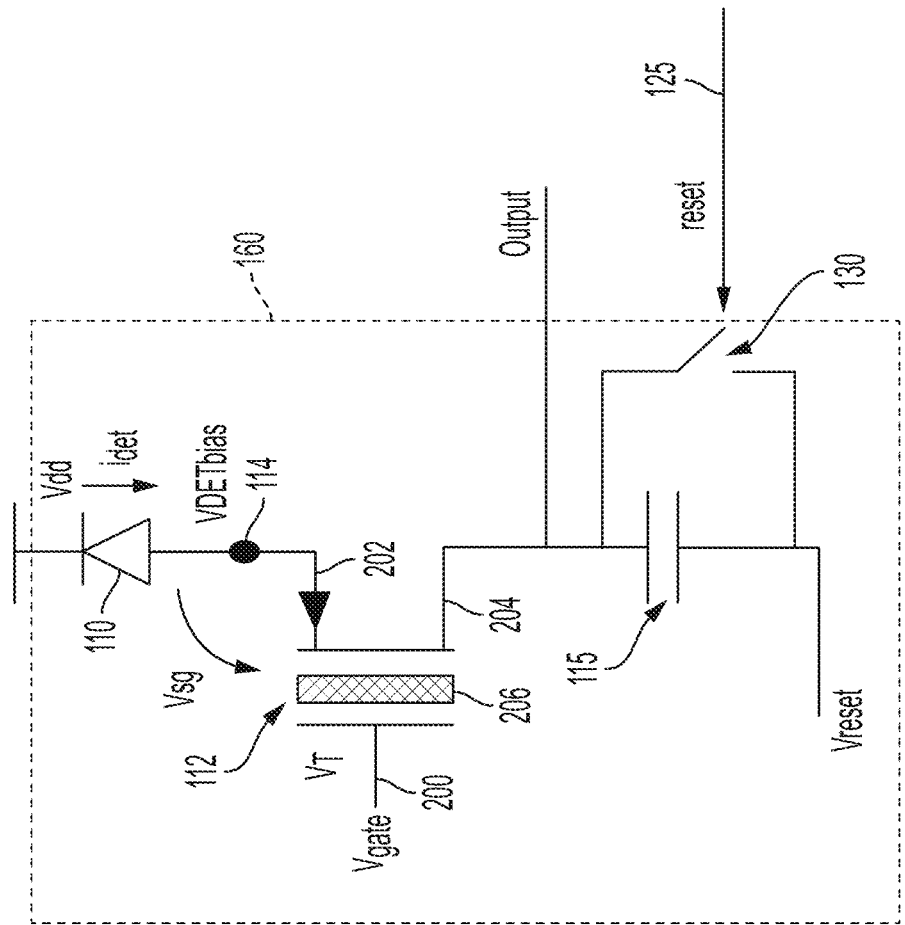
FIG. 2 is a schematic diagram illustrating a unit cell of FIG. 1 that includes a floating gate device and a photo-diode.
Figure 3:
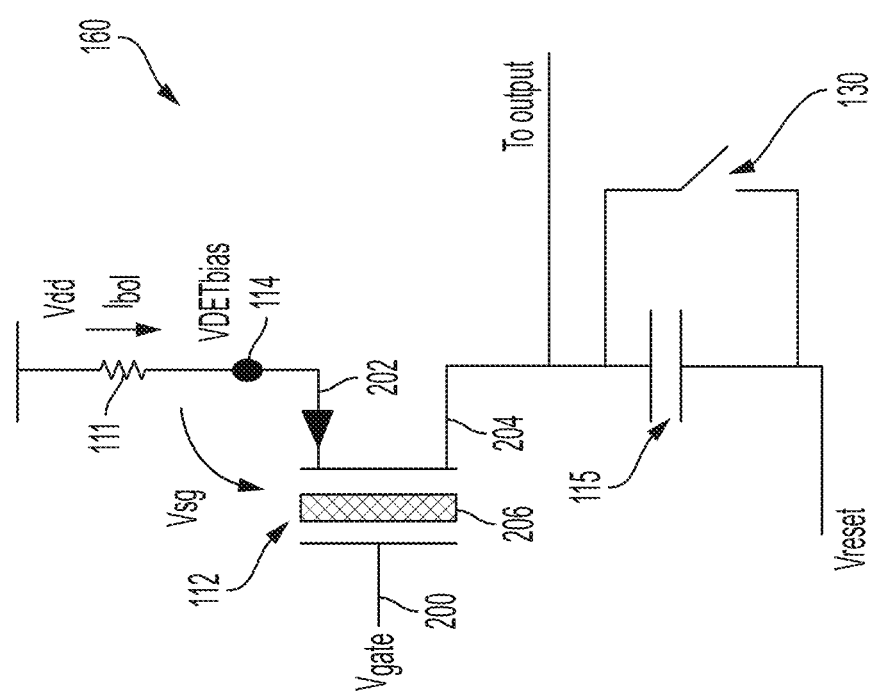
FIG. 3 is a schematic diagram illustrating an input stage that includes a floating gate device and a microbolometer.

FIG. 2 shows an input stage 160 according to one embodiment and includes a photo-diode 110 as the detector. As shown in FIG. 3, the detector could, alternatively, be a microbolometer 111. The input stage 160 includes an input node 114, a floating gate injection device 112, an integration capacitor 115, and a reset switch 130. Charge from the photo-diode 110 is accumulated over the integration capacitor 115. Charge is accumulated, in general, until a readout time. When the end of the integration time is reached, the charge stored in integration capacitor 115 is provided to an output in know manners. Then, the capacitor 115 can be reset by closing the reset switch 130 upon receipt of a reset signal 125. In FIG. 2, the floating gate device is implemented as P-type device. In other embodiments as shown below, the floating gate device could be implemented as an N-type device.

FIG. 3 makes clear that that the detector can be a microbolometer 111 instead. Here, the pixel 161 includes an input node 114, a floating gate injection device 112, an integration capacitor 115, and a reset switch 130. As radiation contacts the microbolometer 111, the resistance thereof changes. This in turn changes current through the microbolometer 111. Current passing through the microbolometer 111 is accumulated over the integration capacitor 115, in general, until a readout time when it is provided to an output.

In either system, control of the photo-diode 110/microbolometer 111 is controlled by the floating gate direct injection device 112. Similar to the prior art, the gate of the floating gate injection device 112 is coupled to a bias voltage (Vbias). In the case where the detector is the photo-diode 110 (FIG. 2), the level of this voltage is selected, in part, to keep the photo-diode 110 in reverse bias. In such a reverse bias configuration, the photo-diode 110 will produce current for two reasons. The first is so called dark current and the other is due to light being absorbed by the diode 110. As discussed above, the range of reverse bias for a diode to perform satisfactorily can vary from diode to diode and can be quite narrow in some instances and different voltages may need to be applied to the gate of floating gate injection device for the diode to operate in a manner that it can produce usable results.

In the case where the detector is a microbolometer 111 (FIG. 3), the voltage can be selected to adjust for resistance non-uniformity of the bolometer.

In prior systems, an NMOS or a PMOS was typically used as the injection transistor. In such systems, the gate of the injection transistor was typically connected to an injection transistor voltage ($V_{DI}$) and a global $V_{DI}$ was applied to the gates of each direct injection transistor in the array. Accordingly, in a typical pixel with a PMOS, the detector bias voltage can be controlled by the gate voltage ($V_{DI}$) as follow:

$$V_{DETBIAS} = V_{DI} + V_{sg};$$

where $V_{sg}$ is the source to gate voltage of the PMOS ....

However, detector non-uniformity (sensor response, noise, leakage) as well as non-uniformity of the global bias circuitry that supplies $V_{DI}$ (transistor matching, $V_{DI}$ supply voltage droop, etc.) across the array can affect the overall performance and yield (pixels not meeting performance) of the imaging array.

Of course, there are ways to apply non-uniformity correction (NUC) to the output of the pixel but that require significant processing power and introduce latency in image formation. Some attempts to remove detector and circuitry non-uniformity, for example, an N bit digital-to-analog converter (DAC) implemented at the pixel level has been proposed but can take significant space in the unit cell layout. Another approach is to sample different $V_{bias}$ per pixel on a capacitor but this can increase circuit noise.

Herein, to remove the effects the above described non-uniformities, the typical injection transistor can be replaced with the illustrated floating gate injection device 112 of both FIGS. 2 and 3. The floating gate injection device 112 of FIGS. 2/3 includes a gate 200, a source 202 and a drain 204. While not limiting, the floating gate injection device 112 can be implemented as a SONOS FET that includes a layer of silicon nitride 206 disposed therein in the gate stack. The layer of silicon nitride 206 can be one of: $Si_3N_4$ or $Si_9N_{10}$. The SONOS FET for each detector 110/111 can be set individually to account for variations in the performance of each photodiode/bolometer and the floating gate injection device 112 itself.

The source 202 of the floating gate injection device 112 is electrically connected to the photodiode 110 (FIG. 2) or the microbolomoeter 111 (FIG. 3) at node 114 and the drain 204 is electrically connected to the integration capacitor 115.

In operation, a voltage ($V_T$) can be stored on the gate 200 of the floating gate injection device 112. This stored voltage can set the bias of the detector (of photodiode 110 (FIG. 2) or the microbolomoeter 111) as discussed more fully below. In more detail, one or more of the gates of the floating gate injection device 112 across an array can each have a different bias in the gate 200 that is held in the silicon nitride layer 206. Once stored, this value can held indefinitely and serves to raise the voltage at which the floating gate injection device 112 will conduct. That is, the "turn on" voltage of each floating gate injection device 112 can be adjusted. The stored voltage will keep node 114 at level that allows for a particular detector to produce an optimal output. As such, the bias circuitry non-uniformities as well as the diode and injection transistor non-uniformities mentioned above can be removed as each unit cell can be programmed to the desired bias voltage level. The overall imaging performance and yield can be improved.

In more detail, the voltage stored on the gate 200 of the floating gate injection device can be referred to herein as $V_T$ and may be referred to as an offset or control voltage herein. The voltage drop across the detector ($V_{det}$) will determine the voltage at the source 202 of the floating gate injection device 112. That voltage is shown as $V_{DETbias}$ at node 114 in FIG. 2 and is taken relative to ground. However, It shall be understood that that $V_{det}$ is dependent on the current ($i_{det}$) through the detector 110 or through the bolomoeter ($i_1$). That current (and thus, $V_{det}$) will be controlled by the floating gate injection device 112 and is a function of $V_T$ Stated in terms of FIG. 2:

$$V_{det} = f(V_T) = V_{dd} - V_{DETbias};$$
$$V_{DETbias} = V_{gate} + Vsg = Vgate + (Vds, sat + V_T).$$

where Vdd $V_{dd}$ is a supply voltage connected to each unit cell It shall be understood that the Vds,sat can be determined based on the square law for FETs.

In the event the floating gate injection device 112 is a SONOS FET, it can store $V_{floating\ gate}$ because in includes a layer of silicon nitride 206. In more detail, in operation, when gate 200 is biased positively, electrons from the transistor source 202 and drain 204 regions tunnel get trapped in the silicon nitride layer 206. This results in an energy barrier between the drain 204 and the source 202, raising the threshold voltage $V_{TSONOS}$ (the gate-source voltage) necessary for current to flow through the floating gate injection device 112. While the operation of a SONOS has been described, it shall be understood that this is not limiting and the disclosed concept of setting the gate voltage can be applied in other types of floating gate devices.

In the above description, the floating gate device 112 has been shown as a P-type device. However, an N-type device could also be used.

Figure 4:
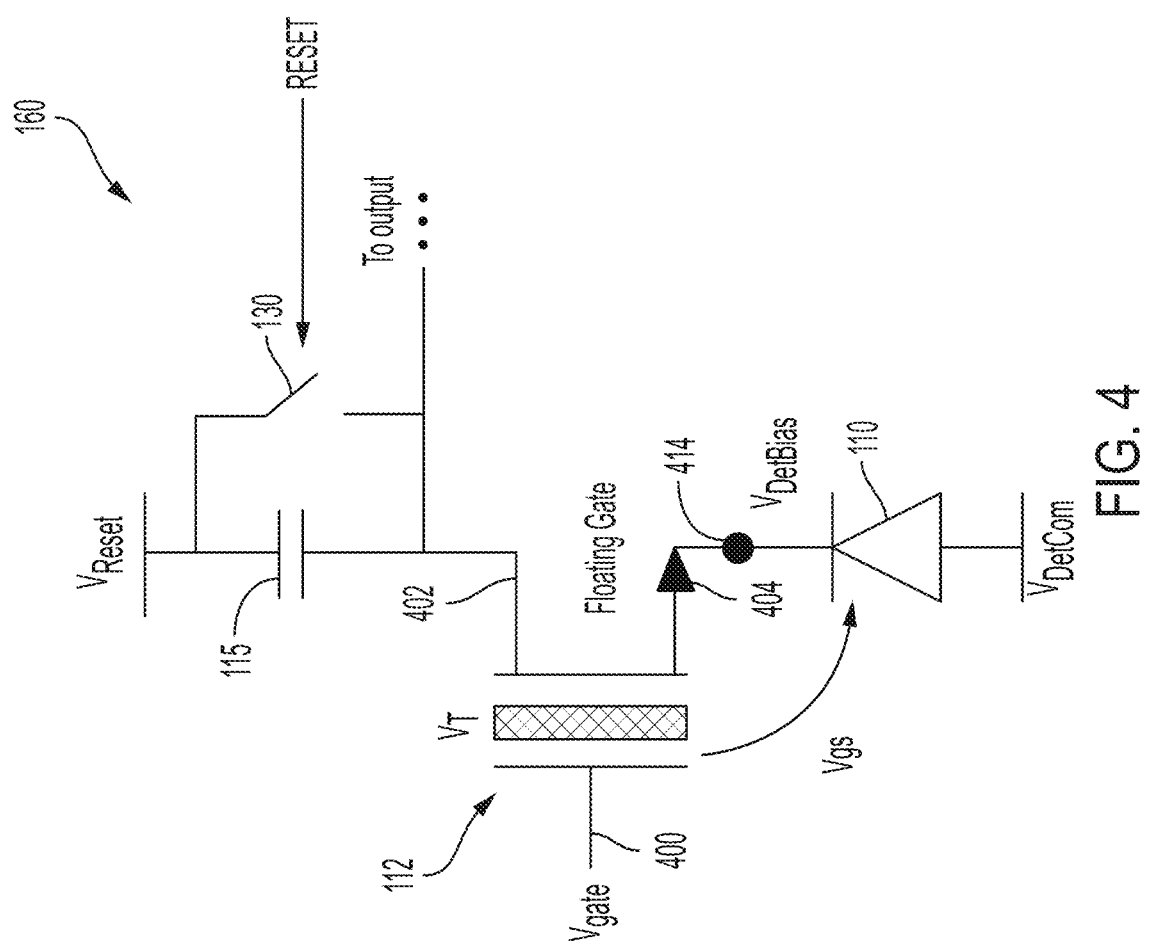
FIG. 4 is a schematic diagram illustrating an alternative input stage (opposite polarity) that includes a floating injection device and a photo-diode.
Figure 5:
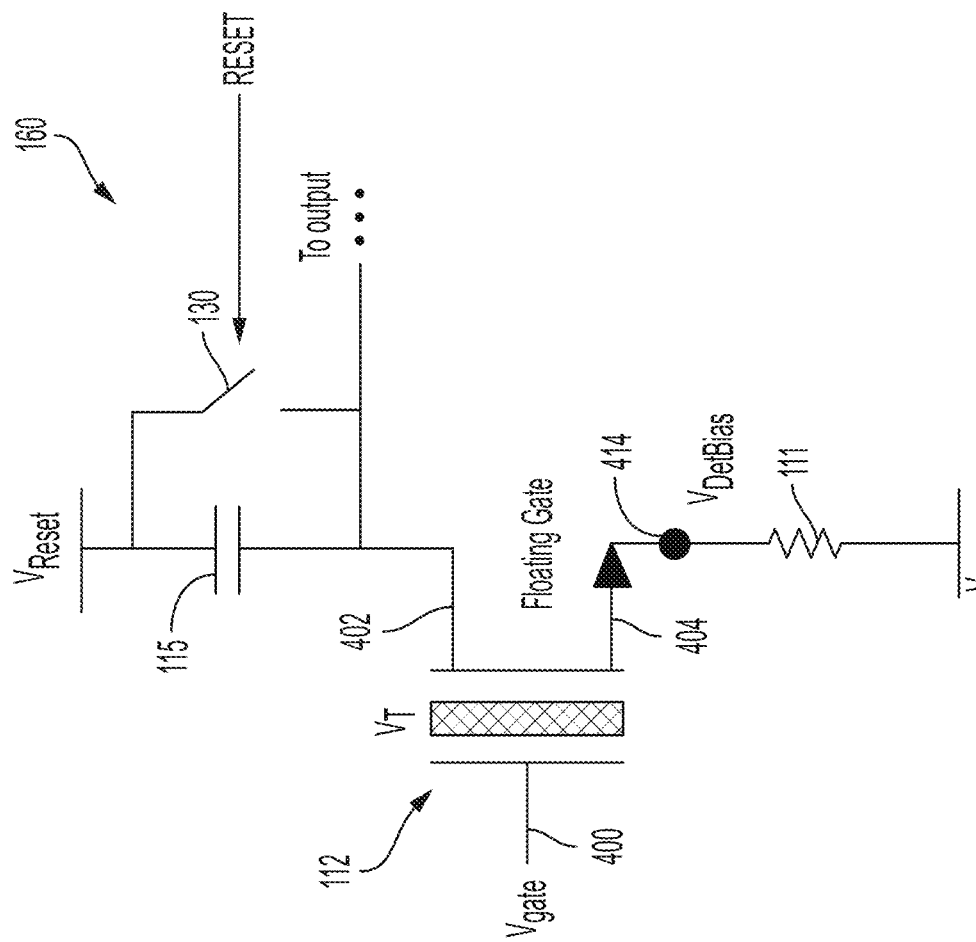
FIG. 5 is a schematic diagram illustrating an alternative input stage that includes a floating gate device and a microbolometer.

For example, and with reference now to FIGS. 4 and 5, an input stage 160 is implement having an N-type floating gate device 400. Contrary to prior embodiments, in this case the input stage 160 can be thought of as system that depletes a charge stored in the integration capacitor 115 based on exposure of the detector 110/111.

FIG. 4 shows an input 160 according to one embodiment and includes a photo-diode 110 as the detector. As shown in FIG. 5, the detector could, alternatively, be a microbolometer 111.

The unit cell 160 includes an input node 414?, a floating gate direct injection device 112, an integration capacitor 115, and a reset switch 130. The input node voltage 414 defining the detector bias is controlled by the floating gate injection device 112. The current flowing through the floating gate device 112 is based on exposure to incident radiation on the detector and the voltage at its gate. The floating gate injection device 112 includes a gate 400, a drain 402 and a source 404. The detector 110/111 is connected between the source 404 and a common connection VDetCom. When the detector 110/111 is exposed to radiation, it allows for conduction from the input (e.g., VDetBias) to common through detector 110/111 based on the amount of exposure.

The gate 400 of the floating gate injection device 112 can be programmed to a particular level which is indicated as $V_T$ in FIGS. 4/5.

In general, charge (positive or negative, depending of the dtector and floating gate polarity) is integrated on the integration capacitor until the end of the integration time and followed by a readout cycle. When that time is reached, the charge stored in integration capacitor 115 is provided to as output to, for example and ADC 140 as described above or to a sample/hold circuit Then, the capacitor 115 can be reset and recharged to a system reference level (Vreset) by closing the reset switch 130 upon receipt of a reset signal 125.

Each reset event is accumulated (counted) with a digital counter circuit 135. At each frame, a "snapshot" of the contents of the digital counter circuit 135 is copied into a register or memory and read out, line by line. This digital counter circuit 135 operates to increase the well capacity $Q_{INT}$ of the integration capacitor 115 by a factor of $2^N$, where N is the number of bits of the digital counter circuit 135. Thus, by conserving the photo-charge relationship within a frame period, this type of pixel 160 may achieve improved signal-to-noise ratio.

The gate 400 of the floating gate injection device 112, as discussed above, can have a stored voltage contained thereon. This stored voltage can adjust bias of the detector (of photodiode 110 (FIG. 4) or the microbolomoeter 111 of FIG. 5 by varying Vgs in a manner similar to that disclosed above.

Once stored, this value can held indefinitely and serves to control the detector bias conditions for a given unit cell at which the floating gate injection device 112 will conduct. That is, the stored voltage will keep node 414 at a level that allows for a particular detector to produce an optimal output. As such, the bias circuitry non-uniformities as well as the diode and injection transistor non-uniformities mentioned above can be removed as each cell can be programmed to the desired bias voltage level. The overall imaging performance and yield can be improved.

Similar to the above, the voltage drop across the voltage across the detector 110, 112 can be expressed as follows:

$V_{det}=f(V_T)=V_{detcom}-V_{DETbias}$;
$V_{DETbias}=V_{gate}+Vsg=Vgate+(Vds,sat+V_T)$.

It shall be understood that the Vds,sat can be determined based on the square law for FETs.

The above description has been focused on so so-called direct injection (DI) front ends. In other embodiments, the front end can be a buffered direct injection (BDI) system. As opposed to the DI front ends, BDI front ends typically include a feedback amplifier. In such cases, an injection transistor is used where the bias voltage is controlled by an amplifier that provides negative feedback to the gate voltage of the injection transistor. Such an in-pixel circuit is referred to as a buffered direct injection (BDI) circuit or cell. A BDI pixel is commonly used to prevent de-biasing of the photodiode for high dynamic range scenes containing areas with high flux. That is, the amplifier can keep the reverse bias across the detector constant, for a wide range of photocurrents.

The floating gate injection device 112 can be used as part of the amplifier. Further, as discussed fully below, the floating gate injection device 112 can be used in an amplifier contained in a CTIA input circuit.

Figure 6:
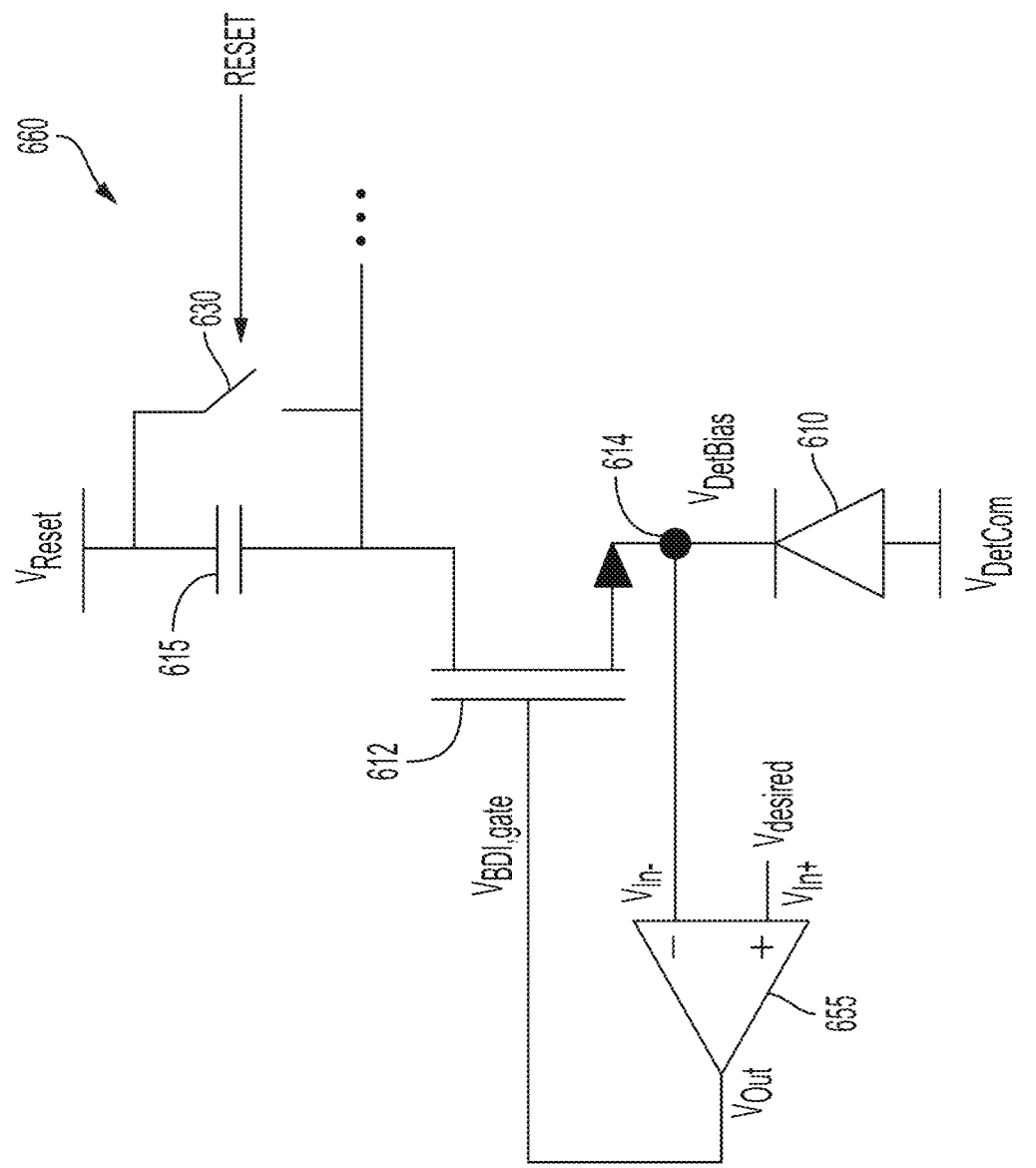
FIG. 6 is a schematic diagram illustrating and buffered direct injection circuit that includes an operational amplifier that includes a floating gate device.

With reference now to FIG. 6, an example of DBI front end 660 is shown connected to photo diode 110, respectively. The photo diode 610 will be referred to as a detector generally and is not meant to limit the detector type.

The front end 660 this embodiment, the injection transistor 613 is an N-type transistor but based on the discussion the skilled artisan will understand how to modify the example circuit if a P-type transistor is utilized.

The front end 660 includes a buffered direct injection integration network. The BDI integration network can include an input node 114, an injection transistor 612, an integration capacitor 115, an amplifier 155, and a reset switch 130.

As above, generally, charge stored on the integration capacitor 615 discharged through the injection transistor 612 (and through the detector 610) based on exposure of the detector to radiation. This happens, in general, until a readout time or until the charge is sampled/held. When the end of the integration time is reached, the charge stored in integration capacitor 115 is provided to a readout circuit. Then, the capacitor 115 can be reset by closing the reset switch 130 upon receipt of a RESET signal.

In FIG. 6, the control of the detector bias is controlled by the direct injection transistor 612. The gate of the injection transistor 612 is coupled to an injection transistor bias voltage $V_{BDLgate}$. The level of this voltage can be selected by the skilled artisan and is used, in part, to keep the detector 110 in reverse bias where the voltage ($V_{DetBias}$) at node 614 is greater than the common voltage $V_{DetCom}$.

In operation, the value of $V_{BDLgate}$ is set by a feedback amplifier 655. The amplifier 655 can either a common source amplifier (single ended) or a differential amplifier. In either case, the amplifier 655 includes the floating gate injection device 112 as illustrated below in FIG. 7. The configuration shown in FIG. 6 is commonly referred to as a buffered direct injection (BDI) configuration. A BDI configuration is commonly used to prevent de-biasing of the detector 110 (e.g., photodiode) for high dynamic range scenes containing areas with high flux. That is, the amplifier 655 can keep the reverse bias across the detector 110 constant, independent of photocurrent.

As shown, the positive input of the amplifier 655 can be connected to or otherwise programmed to a desired (e.g., preset) level referred to as Vdesired and the negative input to $V_{DetBias}$ (e.g., node 614). This can help maintain $V_{BDI\text{-}Gate}$ constant.

As is known, the amplifier will include at least transistor. In particularly, herein the transistor is a floating gate device within the amplifier 655. In a manner similar to above, the response of the amplifier to a particular, comparison voltage (Vdesired) can be adjusted by programing VT into a floating gate device in the amplifier 655. Having such a programmable response to a desired voltage can allow for per pixel adjustments and can help reduce the issues related to device variability and non-uniformity described above.

In operation, inverted gain from the amplifier 655 provides feedback to yield better control over the detector bias (at node 114) at different photocurrent levels. In particular, as the photocurrent increases, the input impedance of the injection transistor 612 is decreased to maintain constant detector bias.

Figure 7:
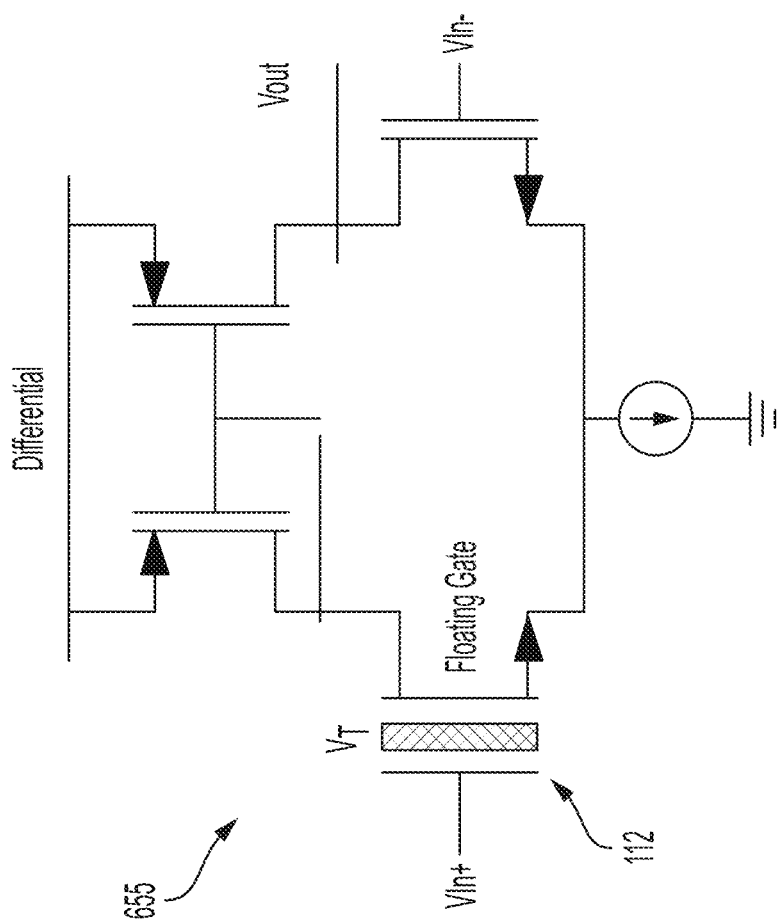
FIG. 7 shows a differential amplifier that includes a floating gate device.
Figure 8:
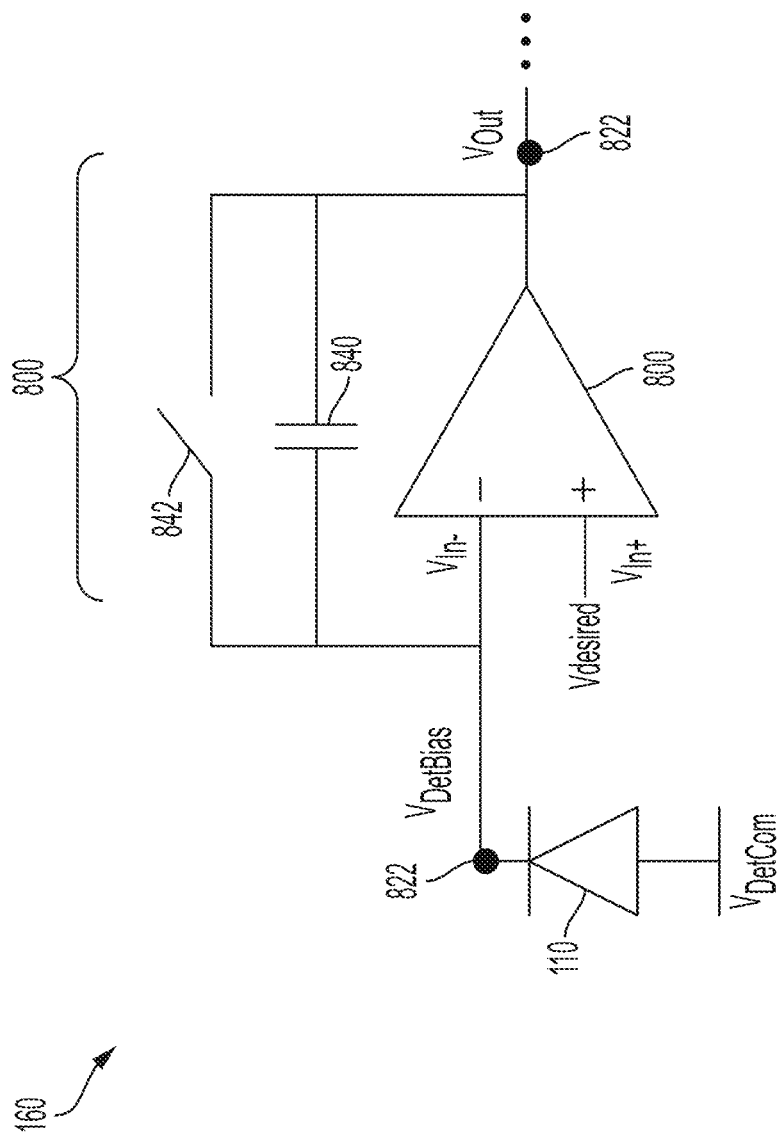
FIG. 8 shows a CTIA circuit that includes a differential amplifier that includes a floating gate device.

With reference now to FIG. 7 a differential amplifiers that may be used in the embodiment of FIGS. 6 and 8 is shown. The amplifier includes include a floating gate device 114. The gate of the floating gate device is connected to VIn+ and has $V_T$ programmed therein as above. In FIG. 7. Of course, the skilled artisan will realize that the amplifier of FIG. 7 could also be implemented as a single ended amplifier.

FIG. 8 shows an alternative front end 860. This front end includes detector 110 connected to in inverting input of an amplifier 800 of a capacitance trans-impedance amplifier (CTIA) circuit 802. As above, the detector 110 is connected to the inverting input (−) of the amplifier and the $V_T$ can be stored into the gate of the floating gate device in the amplifier 800.

The CTIA circuit 802 includes an input 820 and an output 822. The input in connected to the anode of the detector 110. The cathode of the detector 110 can be connected to VDetCom as above. An integration capacitor 840 and a reset switch 842 are connected in parallel with each other and both are connected to the input 820 and the output 822.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A pixel comprising:
   a detector that changes its operating characteristics based on incident energy;
   an integration capacitor arranged to discharge stored charge through the detector based on changes in the operating characteristics; and
   a floating gate injection device disposed between the photo-diode and the integration capacitor that controls flow of the charge from the integration capacitor to the detector, the floating gate injection device having a gate, a source electrically coupled to the detector at a first node, and a drain electrically coupled to the integration capacitor;
   wherein the gate has a control voltage ($V_T$) stored therein to set to a per-pixel bias gate voltage to control a detector bias voltage of the detector at the first node.

2. The pixel of claim 1, wherein the detector is a photo-diode having an anode electrically coupled to a detector common voltage ($V_{DetCom}$).

3. The pixel of claim 2, wherein the integration capacitor is electrically coupled to a system reference level (Vreset).

4. The pixel of claim 3, further including a reset switch coupled in parallel with the integration capacitor.

5. The pixel of claim 1, wherein the detector is a microbolometer having a first end connected to the source and a second end electrically coupled to a detector common voltage ($V_{DetCom}$).

6. The pixel of claim 5, wherein the integration capacitor is electrically coupled to a system reference level (Vreset).

7. The pixel of claim 6, further including a reset switch coupled in parallel with the integration capacitor.

8. A pixel comprising:
   a detector that changes its operating characteristics based on incident energy;
   an integration capacitor arranged to discharge stored charge through the detector based on changes in the operating characteristics;
   an injection transistor device disposed between the photo-diode and the integration capacitor that controls flow of the charge from the integration capacitor to the detector; the injection transistor having a gate, a source electrically coupled to the detector at a first node, and a drain electrically coupled to the integration capacitor; and
   a feedback amplifier that provides a bias voltage to the injection transistor, the feedback amplifier having an active input that is connected to the first node and that compares a voltage at the first node to a desired voltage to create the bias voltage,
   wherein the feedback amplifier includes a floating gate device that has the a control voltage ($V_T$) stored on a gate of the floating gate device.

9. The pixel of claim 8, wherein the detector is a photo-diode having an anode electrically coupled to a detector common voltage ($V_{DetCom}$).

10. The pixel of claim 9, wherein the integration capacitor is electrically coupled to a system reference level (Vreset).

11. The pixel of claim 10, further including a reset switch coupled in parallel with the integration capacitor.

12. The pixel of claim 9, wherein the feedback amplifier is a differential amplifier.

13. The pixel of claim 9, wherein the feedback amplifier is a single ended amplifier.

14. A pixel comprising:
   a detector that changes its operating characteristics based on incident energy, the detector having a first end and a second end, the first end being connected to a first node;
   capacitance trans impedance amplifier (CTIA) circuit coupled to the detector, the CTIA circuit comprising:
   a feedback amplifier that provides a bias voltage, the feedback amplifier having an active input that is connected to the first node and that compares a voltage at the first node to a desired voltage and to provide an output at an output of the CTIA circuit; and
   an integration capacitor connected between the first node and the output of the CTIA circuit;
   wherein the feedback amplifier includes a floating gate device that has a control voltage stored on a gate of the floating gate device.

15. The pixel of claim 14, wherein the detector is a photo-diode having an anode electrically coupled to a detector common voltage ($V_{DetCom}$) and a cathode connected the first node.

16. The pixel of claim 14, further including a reset switch coupled in parallel with the integration capacitor between the first node and the output of the CTIA circuit.

17. The pixel of claim 14, wherein the feedback amplifier is a differential amplifier.

18. The pixel of claim 14, wherein the feedback amplifier is a single ended amplifier.

* * * * *